United States Patent
O'Shea

(10) Patent No.: US 8,559,559 B2
(45) Date of Patent: Oct. 15, 2013

(54) METHOD AND APPARATUS FOR COMPENSATING DC OFFSETS IN COMMUNICATION SYSTEMS

(75) Inventor: Helena Deirdre O'Shea, San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 868 days.

(21) Appl. No.: 11/955,159

(22) Filed: Dec. 12, 2007

(65) Prior Publication Data

US 2008/0089391 A1    Apr. 17, 2008

Related U.S. Application Data

(63) Continuation-in-part of application No. 10/722,229, filed on Nov. 25, 2003, now abandoned, which is a continuation-in-part of application No. 10/600,499, filed on Jun. 19, 2003, now abandoned.

(60) Provisional application No. 60/390,585, filed on Jun. 20, 2002.

(51) Int. Cl.
*H04L 25/06* (2006.01)

(52) U.S. Cl.
USPC ........... 375/319; 375/316; 375/320; 375/322; 375/342; 375/346

(58) Field of Classification Search
USPC ......... 375/135, 145, 146, 219, 250, 259, 295, 375/299, 316, 318, 319, 327, 343, 350, 229, 375/254, 267, 269, 271, 278, 22, 326, 340, 375/342, 344–346
See application file for complete search history.

(56) References Cited

U.S. PATENT DOCUMENTS

| | | | |
|---|---|---|---|
| 4,023,103 A * | 5/1977 | Malm | ............................ 455/62 |
| 4,873,702 A | 10/1989 | Chiu | |
| 4,887,050 A | 12/1989 | Borth et al. | |
| 5,442,655 A | 8/1995 | Dedic et al. | |
| 5,550,868 A | 8/1996 | Boccuzzi | |
| 5,663,988 A | 9/1997 | Neustadt | |

(Continued)

FOREIGN PATENT DOCUMENTS

| GB | 2346777 A | 8/2000 |
|---|---|---|
| JP | 0411465 | 1/1992 |

(Continued)

OTHER PUBLICATIONS

Lindoff, "Using a direct conversion receiver in edge terminals—a new DC offset compensation algorithm" The 11th IEEE International Symposium on Personal, Indoor and Mobile Radio Communications, 2000. PIMRC, vol. 2, Sep. 18-21, 2000, pp. 959-963, XP10520777.

(Continued)

*Primary Examiner* — Hirdepal Singh
(74) *Attorney, Agent, or Firm* — William M. Hooks

(57) ABSTRACT

A communications system receiver incorporates a time-averaged DC component subtracter to subtract a time-averaged DC offset component from a received, processed signal. The time-averaged DC offset is selectably calculated from a moving average or a running average. The selection of the time-averaged DC offset can be done depending on whether the receiver operates in a frequency hop mode or not.

14 Claims, 3 Drawing Sheets

"IDEAL" SYSTEM I & Q COMPONENTS ARE CORRECTLY DETECTED GIVING CORRECT SYMBOL

"ACTUAL" SYSTEM WITH DC OFFSETS ON I, Q OR BOTH COMPONENTS POSSIBLY CAUSING ERROR

(56) References Cited

U.S. PATENT DOCUMENTS

| | | | |
|---|---|---|---|
| 5,724,653 A | 3/1998 | Baker et al. | |
| 5,754,595 A | 5/1998 | Honkasalo (nee Zhu) et al. | |
| 5,760,629 A | 6/1998 | Urabe et al. | |
| 5,898,699 A | 4/1999 | Chiba | |
| 6,363,107 B1 * | 3/2002 | Scott | 375/150 |
| 6,466,832 B1 * | 10/2002 | Zuqert et al. | 700/94 |
| 6,631,143 B1 | 10/2003 | Karim | |
| 6,700,514 B2 | 3/2004 | Soltanian et al. | |
| 6,735,422 B1 | 5/2004 | Baldwin et al. | |
| 6,757,340 B1 | 6/2004 | Jakobsson | |
| 6,901,121 B1 * | 5/2005 | Dubrovin et al. | 375/346 |
| 6,904,110 B2 * | 6/2005 | Trans et al. | 375/350 |
| 6,980,774 B2 | 12/2005 | Shi | |
| 7,079,595 B2 | 7/2006 | Jensen et al. | |
| 7,212,587 B2 | 5/2007 | Khlat et al. | |
| 7,228,109 B2 | 6/2007 | Paulus et al. | |
| 7,233,631 B2 | 6/2007 | Van Bezooijen et al. | |
| 7,369,820 B2 | 5/2008 | Rahman | |
| 7,382,297 B1 * | 6/2008 | Kopikare et al. | 341/118 |
| 7,593,485 B2 * | 9/2009 | Wong et al. | 375/319 |
| 7,738,575 B2 * | 6/2010 | Mahadevappa et al. | 375/260 |
| 7,782,235 B1 * | 8/2010 | Velazquez | 341/118 |
| 8,175,539 B2 * | 5/2012 | Diener et al. | 455/69 |
| 2002/0049075 A1 | 4/2002 | Takagi | |
| 2002/0052187 A1 | 5/2002 | Hosomi | |
| 2002/0160738 A1 | 10/2002 | Allott et al. | |
| 2003/0099310 A1 * | 5/2003 | Zvonar | 375/340 |
| 2004/0109516 A1 | 6/2004 | O'Shea | |
| 2004/0190652 A1 * | 9/2004 | Gamble et al. | 375/344 |
| 2005/0164639 A1 | 7/2005 | Suissa et al. | |
| 2005/0208919 A1 * | 9/2005 | Walker et al. | 455/296 |
| 2005/0286467 A1 * | 12/2005 | Chang et al. | 370/330 |
| 2006/0229044 A1 | 10/2006 | Simmons et al. | |
| 2008/0043887 A1 * | 2/2008 | Simmons et al. | 375/345 |

FOREIGN PATENT DOCUMENTS

| | | |
|---|---|---|
| JP | 06261088 | 9/1994 |
| JP | 07183925 | 7/1995 |
| JP | 09168037 | 6/1997 |
| JP | 1023475 | 1/1998 |
| JP | 1041994 | 2/1998 |
| JP | 10247953 A | 9/1998 |
| JP | 10271180 A | 10/1998 |
| JP | 10285232 | 10/1998 |
| JP | 10303649 | 11/1998 |
| JP | 10308785 | 11/1998 |
| JP | 11215099 A | 8/1999 |
| JP | 2000041073 | 2/2000 |
| JP | 2001177501 A | 6/2001 |
| JP | 2001245007 | 9/2001 |
| JP | 2002141832 | 5/2002 |
| JP | 2003224614 | 8/2003 |
| JP | 2006086768 A | 3/2006 |
| KR | 278816 | 1/2001 |
| KR | 436187 | 6/2004 |
| KR | 20060044112 | 5/2006 |
| WO | WO0156177 | 8/2001 |
| WO | WO2004047388 | 6/2004 |
| WO | WO2007057844 | 5/2007 |

OTHER PUBLICATIONS

International Search Report—PCT/US08/086489, International Searching Authority—European Patent Office, Jun. 4, 2009.

Written Opinion—PCT/US08/086489, International Searching Authority—European Patent Office, Jun. 4, 2009.

Taiwan Search Report—TW097148699—TIPO—Sep. 18, 2012.

* cited by examiner

METHOD AND APPARATUS FOR COMPENSATING DC OFFSETS IN COMMUNICATION SYSTEMS

RELATED APPLICATIONS

This application is a continuation-in-part of copending U.S. patent application Ser. No. 10/722,229, filed Nov. 25, 2003, which is a continuation-in-part of U.S. patent application Ser. No. 10/600,499, filed Jun. 19, 2003, which claims priority to U.S. provisional patent application Ser. No. 60/390,585, filed on Jun. 20, 2002, the full disclosures of which are incorporated herein by reference in their entireties.

DETAILED DESCRIPTION

Figure 1:
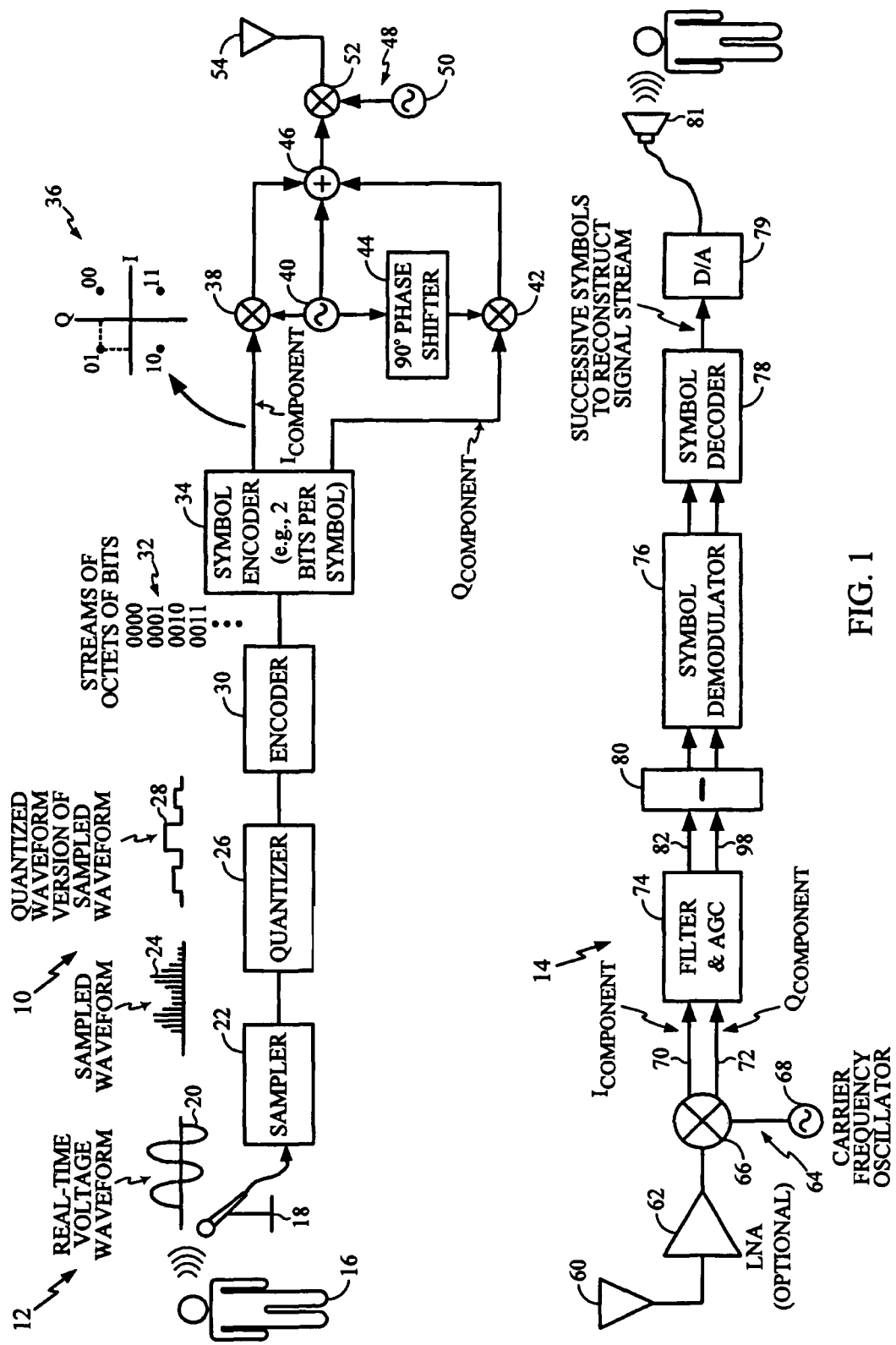
FIG. 1 illustrates a high-level block diagram of a wireless data communication system incorporating a subtracter.

FIG. 1 is a block diagram of a wireless data communications system 10, which includes a transmitter 12 and a receiver 14. At the transmitter 12, as a user 16 speaks into a microphone 18, it converts the sound energy of the user's voice into analog electrical signals having a real-time voltage waveform 20. Although the example shown is described in terms of converted sound energy of a user's voice, the operation of the transmitter 12 is the same, or substantially the same, with respect to other types of signals as well. With appropriate modifications, the transmitter 12, as well as the receiver described below, may also be used to transmit and receive digital signals, the analog embodiment being shown only by way of example.

With reference again to the analog embodiment, a sampler 22 converts the analog electrical signals into discrete electrical signals to provide a sampled waveform 24. A quantizer 26 quantizes the discrete electrical signals into pulse amplitude modulation voltages, representing a quantized waveform version of the sampled waveform 28. An encoder 30 encodes the quantized discrete electrical signal into a string of bits, for example, represented by a stream of eight bit words, or octets 32. The octets are encoded by a symbol encoder 34 according to a symbol encoding scheme. Thus, for example, the symbol encoder 34 encodes each successive two bits of each octet to provide a stream of two bit symbols.

The symbols produced by the symbol encoder 34 represent the values of $I_{component}$ and $Q_{component}$ vectors such that their vector sum results in an appropriate value under the defined signal scheme. The $I_{component}$ vector is multiplied in multiplier 38 by a first sine wave produced by oscillator 40 to produce a modulated "in-phase" (I) signal. On the other hand, the $Q_{component}$ vector is multiplied in multiplier 42 by a second sine wave produced by the oscillator 40 that has been shifted 90° by a 90° phase shifter 44 to produce a modulated "quadrature-phase" (Q) signal. The I and Q modulated signals are added by an adder 46 together with the sine wave produced by oscillator 40 to produce a composite signal, which is received by modulator 48 to modulate a carrier sine wave. The modulator 48 includes an oscillator 50 and multiplier 52, which multiplies the composite and the oscillator signals to produce the modulated carrier signal, which is then transmitted by an antenna 54.

At the receiver 14, the transmitted signal is received by an antenna 60, which feeds the received signal into a low noise amplifier (LNA) 62, the output of which is connected to a mixer 64, also known as a demodulator. The mixer 64 includes a multiplier 66 and oscillator 68 arranged to produce quadrature output signals on lines 70 and 72. The signals on lines 70 and 72 are connected to a filter and automatic gain control unit (AGC) 74. The filter and AGC unit 74 automatically adjusts the gain applied to the output signals from the AGC 74 as a function of the strength of the modulated carrier received via antenna 60, in order to maintain a relatively constant output signal level.

The quadrature output signals from the filter and AGC unit 74 are connected through a subtracter 80, below described in detail, to a symbol demodulator 76, which demodulates the automatic gain controlled version of the received signal to produce both the in-phase (I) signal and the quadrature-phase (Q) signals, which respectively represent the received values of the $I_{component}$ vector and $Q_{component}$ vector signals. Thereafter, a symbol decoder 78, which may be a quadrature phase shifted keyed (QPSK) decoder, uses the two bit values of the $I_{component}$ and $Q_{component}$ vectors to produce the decoded successive symbol bits in a stream of reconstructed octet words. The reconstructed octet words are then passed to D/A converter 79, which outputs an analog electrical signal which is converted into sound energy by speaker 81. In processing a digital signal, the output from the signal decoder may be separately processed, without need for the D/A converter 80.

Figure 2:
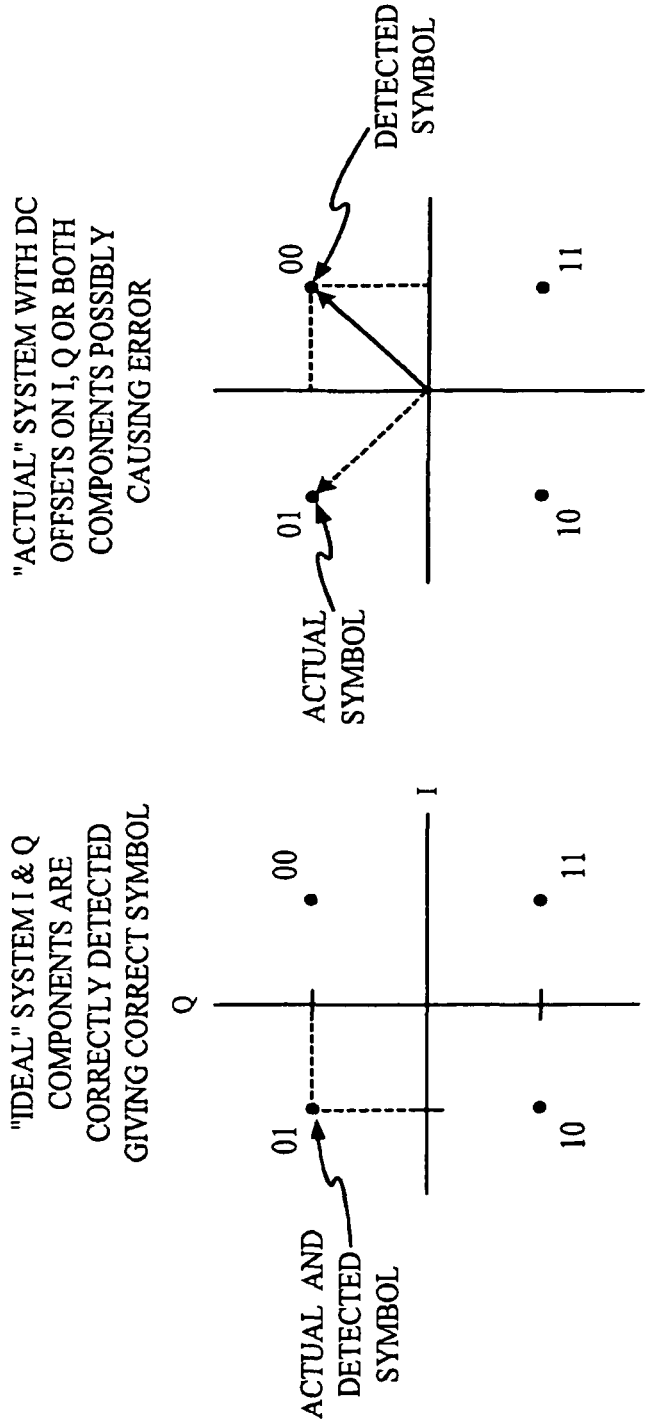
FIG. 2A illustrates a signal map of in-phase (I) and quadrature-phase (Q) inputs to a symbol decoder in an "ideal" or theoretical system.
FIG. 2B illustrates a signal map of I and Q inputs to a symbol decoder in the presence of direct current (DC) offsets.

Referring additionally now to FIG. 2a, a map of the I and Q inputs to the symbol decoder 76 in an "ideal," or theoretical, system, are shown. In the ideal system, both the I and Q components are always detected correctly by the symbol decoder 78. For instance, in the example shown, respective I and Q values "0" and "1" are properly decoded as "01".

However, in an actual, physical system, an example of the signal map of which is shown in FIG. 2b, without the use of the subtracter 80 system irregularities give rise to direct current (DC) offset voltages on either or both the I and Q components. Factors that may cause the values of the I and Q value to contain a DC offset, for example, include the presence of noise and variations of the signal strength of the received signal, as well as component and circuit imbalances and designs in the receiver system. Moreover, due to the effects of the AGC 74, the DC offsets will tend to vary over time. Such time-varying DC offsets may be difficult to compensate.

Insofar as symbol decoder 78 relies upon both the sign and magnitude of the detected voltages of the respective I and Q components in order to correctly decode a received symbol, the presence of DC offset voltages can result in symbol decoder 78 incorrectly decoding a received symbol. In the example shown, for example, the respective values for I and Q of "0" and "1" shown in FIG. 2a have erroneously been detected as "00", shown in FIG. 2b.

Figure 3:
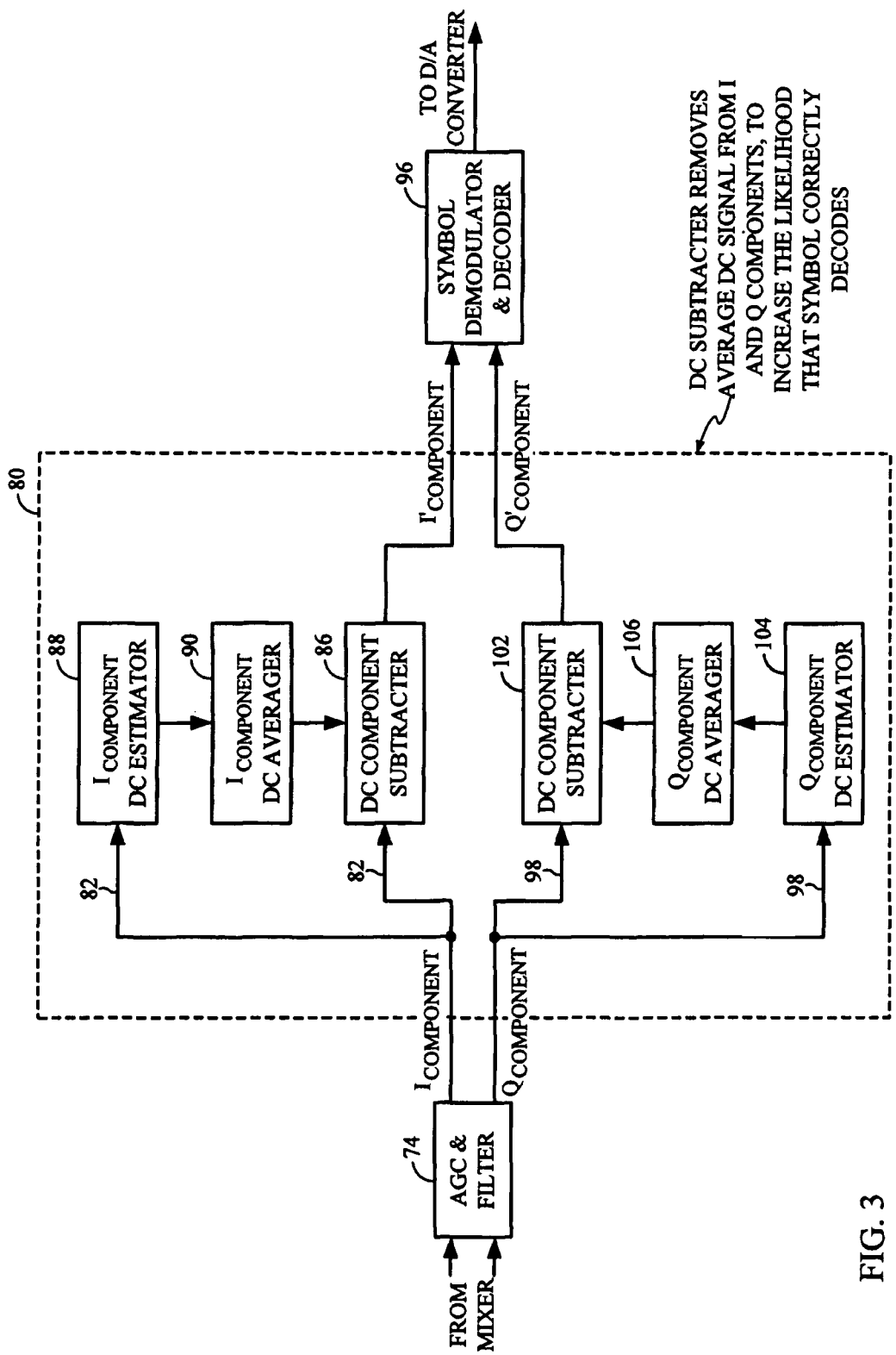
FIG. 3 illustrates a block diagram of a receiver incorporating a DC component subtracter.

The DC offsets which may be present in the received signals, however, can be substantially reduced or eliminated, regardless of whether AGC 74 is causing such DC offsets to change over time, through the use of the subtracter 80 and methods illustrated in the block diagram of FIG. 3, to which reference is now additionally made.

The subtracter 80 is placed between the filter & AGC 74 and the symbol demodulator 76 and symbol decoder 78 in the receiver portion of the system 10 (the symbol demodulator 76 and symbol decoder 78 being represented for convenience as a single block 96). Briefly, in the subtracter 80, a time-averaged value of the DC offsets of both I and Q components are substantially removed or eliminated before symbol decoding is performed.

In the subtracter 80, the demodulated in-phase $I_{component}$ signal on line 82 is fed into an $I_{component}$ DC estimator 88. The DC estimator 88 determines an instantaneous DC level in the $I_{component}$ signal, such as through low pass filtering techniques, or the like. The output of the $I_{component}$ DC estimator 88 is fed into an $I_{component}$ DC averager 90, which calculates a time-average of its DC input. The average may be calculated and updated periodically.

In an embodiment, the average may be updated whenever a new output value of the $I_{component}$ DC estimator 88 is made available. In this specification and in the claims, such an average is termed a "moving average." A DC averager calculating a moving average is termed to be in a "moving average mode." The moving average may be calculated as the average of the $I_{component}$ DC estimator 88 output over a predetermined number of values.

In an alternative embodiment, the average may be updated once every predetermined time interval. In this specification and in the claims, such an average is termed a "running average." A DC average calculating a running average is termed to be in a "running average mode." The running average may be calculated as the average of the $I_{component}$ DC estimator 88 over the predetermined time interval. For example, the predetermined time interval may encompass a plurality of DC estimator output values.

In an alternative embodiment, the average may be calculated by another averaging technique.

According to the present disclosure, the DC averager 90 may switch from a moving average mode to a running average mode if the DC offset in the $I_{component}$ signal is expected to change discontinuously, and vice versa. In an embodiment, the $I_{component}$ DC averager 90 may switch between moving average mode and running average mode based on an operating mode of the receiver. For example, if the operating mode of the receiver is a frequency hop mode, the DC averager 90 may be configured to operate in a running average mode. The predetermined time period of the running average mode may be configured such that only DC estimate values corresponding to a single frequency hop are averaged together. In contrast, if the operating mode of the receiver is a non-frequency hop mode, the DC averager 90 may be configured to operate in a moving average mode.

The output of the $I_{component}$ DC averager 90 is fed into the DC component subtracter 86, which subtracts the time-averaged DC component from the demodulated in-phase $I_{component}$ signal on line 82. The output of the DC component subtracter 86 $I'_{component}$, which represents the $I_{component}$ value having any DC offset that may be contained therein substantially removed, then is fed into the symbol demodulator and decoder 96.

At the same time, in the quadrature signal channel, the demodulated quadrature-phase $Q_{component}$ signal on line 98 is fed into a $Q_{component}$ DC estimator 104. The DC estimator 104 determines an instantaneous DC level in the $Q_{component}$ signal, using techniques described above with respect to the $I_{component}$ DC estimator 88. The output of the $Q_{component}$ DC estimator 104 is fed into a $Q_{component}$ DC averager 106, which calculates a time-average of its DC input using, for example, techniques described above with respect to the $I_{component}$ DC averager 90.

The output of the $Q_{component}$ DC averager 106 is fed into the DC component subtracter 102, which subtracts the time-averaged DC component from the demodulated quadrature-phase $Q_{component}$ signal on line 98. The output of the DC component subtracter 102 $Q'_{component}$, which represents the $Q_{component}$ value having any DC offset that may be contained therein substantially removed, then is fed into the symbol demodulator and decoder 96.

The systems, functions, and operations described in the block diagrams, graphs, or examples above may be implemented, individually or collectively, in hardware, software, firmware, or a combination thereof For example, the functions may be implemented in application specific integrated circuits (ASICs), standard integrated circuits, as one or more computer programs running on a computer, computer system, one or more controllers (e.g., microcontrollers), one or more processors (e.g., microprocessors), or any combination thereof In addition, the processes, methods, or techniques of the invention may be distributed as a program product in a variety of forms, such as may be incorporated in a digital storage medium, or the like.

The invention claimed is:

1. An apparatus for use in a communications system, the apparatus comprising:
    a DC estimator to receive an input signal and generate estimate values of the input signal's DC level;
    a DC averager to receive the estimate values and generate a DC average, the DC average selectable from a moving average of the estimate values or a running average of the estimate values, wherein the moving average is updated whenever a new estimate value is available, and wherein the running average is updated once every predetermined time interval; and
    a subtracter unit to subtract the DC average from the input signal, the DC averager configured to select a running average if the receiver is in a frequency hop mode, the DC averager further configured to select a moving average if the receiver is not in a frequency hop mode;
    the input signal comprising an in-phase (I) component and a quadrature (Q) component, the DC estimator configured to generate estimate values for each of the I and Q components, the DC averager configured to generate DC averages for the estimate values generated for each of the I and Q components, and the subtracter unit configured to subtract a DC average from each of the I and Q components.

2. An apparatus for use in a communications system, the apparatus comprising:
    a DC estimator to receive an input signal and generate estimate values of the input signal's DC level;
    a DC averager to receive the estimate values and generate a DC average, the DC average selectable from a moving average of the estimate values or a running average of the estimate values, wherein the moving average is updated whenever a new estimate value is available, and wherein the running average is updated once every predetermined time interval; and
    a subtracter unit to subtract the DC average from the input signal, the DC averager configured to select a running average if the receiver is in a frequency hop mode, the DC averager further configured to select a moving average if the receiver is not in a frequency hop mode; the apparatus further comprising:
    an automatic gain correction unit to receive an uncorrected modulated composite signal, provide gain correction, and output a corresponding gain corrected modulated composite signal as the input signal; and
    a symbol decoder to receive the demodulated component output from the subtracter unit and output a corresponding plurality of symbol bits.

3. The apparatus of claim 2, wherein the apparatus is a handset in a wireless communication system, further comprising:
an antenna to communicate a wireless signal to the automatic gain correction unit;
a converter unit to convert the plurality of symbol bits output from the symbol decoder into a corresponding analog signal; and
a transducer for converting the analog signal from the converter unit into an acoustic signal.

4. The apparatus of claim 2, wherein the apparatus is an integrated circuit adapted for use in a handset, the handset comprising:
an antenna to communicate a wireless signal to the automatic gain correction unit;
a converter unit to convert the plurality of symbol bits output from the symbol decoder into a corresponding analog signal; and
a transducer for converting the analog signal from the converter unit into an acoustic signal.

5. The apparatus of claim 4, wherein the communication system further comprises a transmitter to transmit the wireless signal to the antenna.

6. A method for use in a communication system, the method comprising:
receiving an input signal and generating estimate values of the input signal's DC level using a DC estimator;
receiving the estimate values using a DC averager to generate a DC average, the DC average selectable from a moving average of the estimate values or a running average of the estimate values, wherein the moving average is updated whenever a new estimate value is available, and wherein the running average is updated once every predetermined time interval; and
subtracting the DC average from the input signal, further comprising selecting a running average if the receiver is in a frequency hop mode, and selecting a moving average if the receiver is not in a frequency hop mode;
the input signal comprising an in-phase (I) component and a quadrature (Q) component, the DC estimator configured to generate estimate values for each of the I and Q components, the DC averager configured to generate DC averages for the estimate values generated for each of the I and Q components, and the subtracting comprising subtracting a DC average from each of the I and Q components.

7. A method for use in a communication system, the method comprising:
receiving an input signal and generating estimate values of the input signal's DC level using a DC estimator;
receiving the estimate values using a DC averager to generate a DC average, the DC average selectable from a moving average of the estimate values or a running average of the estimate values, wherein the moving average is updated whenever a new estimate value is available, and wherein the running average is updated once every predetermined time interval; and
subtracting the DC average from the input signal, further comprising selecting a running average if the receiver is in a frequency hop mode, and selecting a moving average if the receiver is not in a frequency hop mode; the method further comprising:
receiving an uncorrected modulated composite signal, providing gain correction, and outputting a corresponding gain corrected modulated composite signal as the input signal; and
symbol demodulating the output of said subtracting.

8. The method of claim 7, further comprising:
decoding the demodulated symbols;
converting the decoded symbols into a corresponding analog signal; and
converting the analog signal from the converter unit into an acoustic signal.

9. An apparatus for use in a communications system, the apparatus comprising:
DC estimator means for receiving an input signal and generating estimate values of the input signal's DC level;
DC averager means for receiving the estimate values to generate a DC average, the DC average selectable from a moving average of the estimate values or a running average of the estimate values, wherein the moving average is updated whenever a new estimate value is available, and wherein the running average is updated once every predetermined time interval; and
subtracter means for subtracting the DC average from the input signal, further comprising means for selecting a running average if the receiver is in a frequency hop mode, and selecting a moving average if the receiver is not in a frequency hop mode;
the input signal comprising an in-phase (I) component and a quadrature (Q) component, the DC estimator means configured to generate estimate values for each of the I and Q components, the DC averager means configured to generate DC averages for the estimate values generated for each of the I and Q components, and the subtracter means comprising subtracting a DC average from each of the I and Q components.

10. The apparatus of claim 9, wherein the communication system further comprises a transmitter to transmit the wireless signal to the antenna.

11. The apparatus of claim 9, wherein the apparatus is a programmable microprocessor running executable code in a handset configured to operate within the communications system.

12. The apparatus of claim 9, wherein the uncorrected modulated composite signal is a quadrature phase shift keying signal.

13. An apparatus for use in a communications system, the apparatus comprising:
DC estimator means for receiving an input signal and generating estimate values of the input signal's DC level;
DC averager means for receiving the estimate values to generate a DC average, the DC average selectable from a moving average of the estimate values or a running average of the estimate values, wherein the moving average is updated whenever a new estimate value is available, and wherein the running average is updated once every predetermined time interval; and
subtracter means for subtracting the DC average from the input signal, further comprising means for selecting a running average if the receiver is in a frequency hop mode, and selecting a moving average if the receiver is not in a frequency hop mode; the apparatus further comprising:
means for receiving an uncorrected modulated composite signal, providing gain correction, and outputting a corresponding gain corrected modulated composite signal as the input signal; and
means for symbol demodulating the output of said subtracting.

14. The apparatus of claim 13, further comprising:
means for decoding the demodulated symbols;
means for converting the decoded symbols into a corresponding analog signal; and
means for converting the analog signal from the converter unit into an acoustic signal.

* * * * *